Patented Oct. 26, 1954

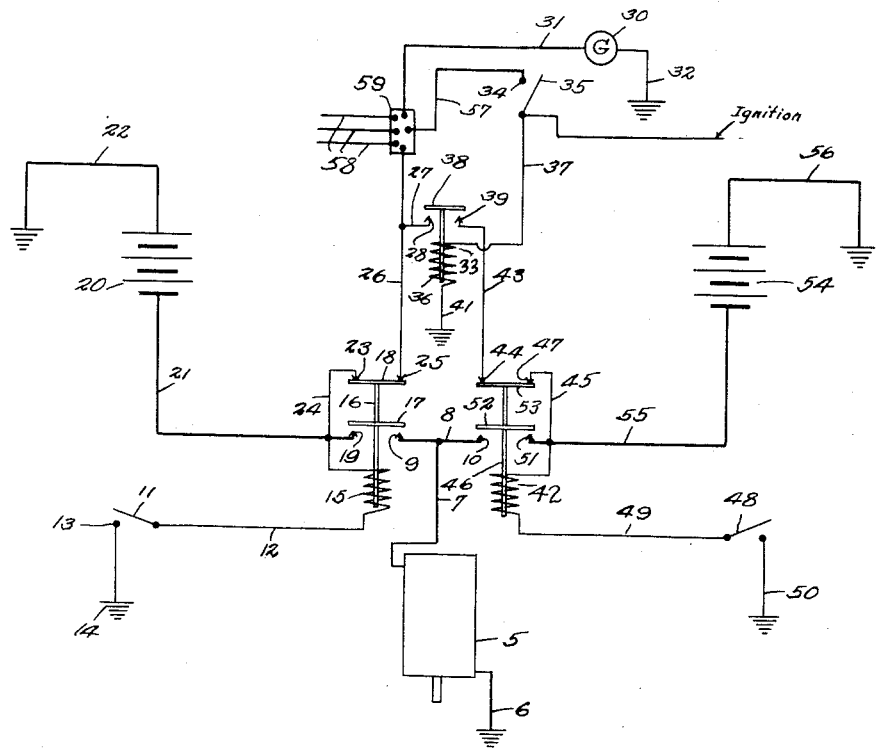

2,692,953

UNITED STATES PATENT OFFICE 2,692,953

SELECTIVE BATTERY CONTROL SYSTEM

Fred S. Markett, Jr., Arcadia, Fla.

Application December 4, 1952, Serial No. 324,039

5 Claims. (Cl. 290—38)

The present invention relates to a new and improved selective battery control system primarily useful with ignition fired internal combustion engines.

For many years, it has been known that cars utilizing a single battery are difficult to start during cold weather, or under any other conditions increasing the internal friction of the engine, or when the single battery used in such cars is in "bad" condition. This is because the starter motor in these circumstances requires a comparatively very large amount of current which results in a serious drop in the voltage available to the ignition system of the automobile. When the spark across the spark plugs in a car is of less than a certain established intensity, it is difficult to ignite the gasoline-air mixture within the motor cylinders. Under most conditions, virtually any battery, regardless of its condition, will provide a sufficient current to supply the ignition system of an internal combustion engine alone.

In order to avoid the difficulties inherent with a single battery system, such as is described in the preceding paragraph, a number of dual battery devices and circuits have been developed for trucks, cars, and the like. Usually, these devices are connected in such a manner that one and only one battery is employed in the circuit with the starter motor, while a second battery is employed for the ignition system. Because of the discrepancies of the load between these two circuits, and because of the difficulties in charging one or both of these batteries from a single generator, such dual battery systems have not proved completely satisfactory in use. In short, the prior art dual battery systems for internal combustion engines have not possessed the necessary degree of flexibility for smooth operation over continued periods.

It is an object of the present invention to overcome the aforegoing disadvantages of the prior art systems utilized with internal combustion engines. A further object of the invention is to provide a dual battery system which is dependable under the most extreme adverse conditions, and which operates quickly, easily, and with a minimum of attention. A still further object is to provide a battery control system for internal combustion engines in which there is a high degree of selectivity between the batteries employed for varying purposes.

The aforesaid and related objects of the invention are broadly obtained by the construction of a battery control system in which either of two separate batteries may be utilized so as to provide the large amount of current required for a starter motor, while the second battery can be utilized to meet the other operating demands of an internal combustion engine, and if this engine is positioned within a motor vehicle, those demands of the vehicle itself. Further details of the invention, as well as the selectivity between the two batteries employed, and the automatic nature of the circuits utilized, will be apparent from the accompanying drawing which diagrammatically depicts the dual battery control system of the present invention.

It is seen from the drawing that starter motor 5 may be energized by either battery 20 or battery 54 by closing either switch 11 or 43, so as to energize the coils 15 or 42 opening the normally closed relays 16 and 46. When the switch 11 is utilized for this purpose, this current flows through the wires 22, 21, 12 and from contact 19 through contact 17 to 9, and thence, through the wire 7 to the starter motor 5, and finally, back to ground through the wire 6. When the battery 54 is to be used to actuate the starter motor, switch 43 is closed causing current flow through the wires 56, 55, 49 and 50. The current flow through the coil 42 opens the relay 46 causing current to flow through the terminals 51, 52, 10, and thence through the wire 8 to the starter motor 5 grounded at 6.

Normally, the relay 16 is biased in such a manner that the current from the battery 20 goes through wires 21 and 24 through terminals 23, 18 and 25, and thence, through wire 26 to a common junction box 59, and thence out through the various leads 58 to the different electrical components utilized with the engine, such as, for example, lights, horn, etc., and lead 57 going through switch 35 to the ignition system of the car, and by means of wire 37 through coil 36 of the relay 33, and thence to ground. The purpose of this relay will be more fully explained later. The junction box 59 is also connected by means of a wire 31 to the generator. This generator is grounded in the conventional manner as at 32.

The relay 46 is normally biased in such a manner as to establish electrical connection by means of the bar 53 across the contacts 44, 47 from the battery 54 through wires 55 and 45 to the wire 45. When the relay 33 is closed by means of current from the battery 20 flowing through wires 21, 24 across the relay bar 18 connecting the contacts 23 and 25 and thence through wire 26 through the junction box 59, and further through the lead 57 through the ignition switch 35 and thence through wire 37 and relay coil 36 to ground 41; the current in the wire 43 is carried across the contacts 28 and 39 by means of the bar 38. Current from the contact 28 flows through the wire 27 to the wire 26.

*Operation*

The operation of the present selective battery control system is quite simple. In use, one desiring to use an internal combustion engine equipped with the present device first closes ignition switch 35 as by use of a key (not shown). This draws current from the battery 20 so as to energize the relay 33 placing both the battery 20 and the battery 54 in parallel through the junction box 59. At this point, either the starter button 11 or the starter button 48 may be used to operate the starter motor 5. When either of the two starter switches is used, the corresponding battery is disconnected from the general parallel circuit flowing through the junction box 59, and is used solely to operate the starter motor, while the other battery supplies the operating demands of the motor. If desired, both batteries may be utilized simultaneously so as to provide an unusually heavy surge of current to operate the starter motor 5. Under these conditions, it is seen that both relays 16 and 46 are energized so as to disconnect the batteries 20 and 54 from any parts of the system except the starter motor. When both batteries are used in this manner it is necessary to release the starter button 11 initially in order to provide current for the ignition and to re-energize the relay 33.

During the operation of a motor equipped with the present system, both of the batteries employed are connected in parallel, and as a consequence, the charges within the batteries 20 and 54 tend to become equal. In a similar manner, the current from the generator 30 flows so as to charge these batteries in accordance with the established laws of parallel electrical circuits. In case one of the batteries 20 or 54 is defective, there is no danger of this battery "bleeding" the other battery during nonoperation because the relay 33 automatically opens when the ignition switch 35 is disconnected.

It will be understood by those skilled in the art that the present invention is capable of a variety of modifications. The term "biased" as used herein refers to the use of springs to normally hold relay members in the indicated positions.

As many apparently widely different embodiments of this invention may be made without departing from the spirit and scope hereof, it is to be understood that the invention is not limited to the specific embodiments hereof, except as defined in the appended claims.

What is claimed is:

1. A selective battery control system for ignition fired internal combustion engines which comprises at least two batteries, a starter motor, separate electrical circuit means connecting said motor and each of said batteries, said means including relays normally biased in a position so as to by-pass current flow from said starter motor, and means to energize said relays either individually or collectively so as to cause current to flow through said starter motor, and means to distribute current from said batteries through said relays to other circuit means during normal operation of said control system.

2. A selective battery control system for internal combustion engines which comprises a first battery, a second battery, a starter motor, an ignition electrical system to meet the operating needs of said internal combustion engine, a first relay, a second relay, a third relay, electrical circuit means including a first starter switch connecting said first battery, said first relay, said ignition system, and said starter motor; said first relay being normally biased in such a manner that current flows from said first battery, through said first relay, through the ignition system of said internal combustion engine, but adapted to close so that current flows from said first battery through said first relay to said starter motor when said first starter switch is closed, electrical circuit means including a second starter switch connecting said second battery, said second relay, said ignition system and said starter motor; said second relay normally biased in such a manner that current flows from said second battery through said second relay to the ignition system of said internal combustion engine, said second relay being adapted to close so that current flows from said second battery through said second relay to said starter motor when said second starter switch is closed, said third relay being connected to said ignition system in such a manner as to close when current flows from said first battery through said ignition system enabling current to flow from said second relay and said second battery through said ignition system, said third relay being adapted to open when current ceases to flow through said ignition system, thereby disconnecting said first and second battery means.

3. A new and improved selective battery control system for ignition fired internal combustion engines which comprises first and second battery means, first, second and third relay means connecting said first and second battery means, said second relay means normally biased in an open position to prevent the flow of current through it, said first and third relay means normally biased in a position so as to establish electrical contact between said first and second battery means and the contacts of said second relay means, ignition means connected electrically to one terminal of said second relay means, said ignition means connected in such a manner that part of the current flowing through said ignition means actuates said second relay means so as to establish electrical contact between its terminals, said second relay means automatically opening when current ceases to flow through said ignition means, a starter motor, first and second starter switches connected to said first and third relay means and said first and second battery means respectively, said starter switches positioned so as to cause current flow to actuate said first and third relay means opening the electrical circuit between said first and third relay means and said second relay means when either said first or said second starter switches is closed, said first and said third relay means connected to said first and said second battery means and the said starter motor so as to actuate said starter motor when current flow from either of said battery means through said second relay means is interrupted by closing either said first or said second starter switches.

4. A selective battery control system for ignition fired internal combustion engines having an ignition circuit which comprises at least two batteries, a starter motor, separate electrical circuit means connecting said motor and each of said batteries, said means including relay switches normally biased in a position to by-pass current flow from said respective batteries through said ignition circuit, said ignition circuit including a relay operated switch connecting said means and said ignition circuit, means to energize said relays either individually or collectively so as to cause current to flow through said starter motor from either or both of said batteries and to flow through said ignition circuit from either or both of said batteries, and additional circuit means connected to distribute current from at least one of said batteries to other circuit means when either of said batteries are connected to said starter motor.

5. A selective battery control system for ignition-fired internal combustion engines which comprises at least two independently grounded batteries, an independently grounded starter motor, separate electrical circuit means connecting said motor and each of said batteries, each said means including a normally open relay operated switch, means to selectively energize said relay switches either individually or collectively so as to cause current to flow through said starter motor, an ignition circuit including a normally open ignition switch, a relay coil in said ignition circuit, additional switch and circuit means connected between said batteries and including a normally opened switch adapted to be energized by said ignition circuit relay coil, and a pair of normally closed switch means integrally connected with said respective separate electrical circuit means, and means respectively connecting said pair of normally closed switch means and said normally open switch means for operation upon energization and deenergization of said selectively energizable relays.

References Cited in the file of this patent

UNITED STATES PATENTS

| Number | Name | Date |
|---|---|---|
| 1,192,400 | Edison | July 25, 1916 |
| 1,288,938 | Leonard | Dec. 24, 1918 |
| 1,828,620 | Rall | Oct. 20, 1931 |
| 1,898,370 | Hughes et al. | Feb. 21, 1933 |
| 2,044,917 | Richardson | June 23, 1936 |
| 2,085,275 | Schmidt | June 29, 1937 |
| 2,096,378 | Mitchell | Oct. 19, 1937 |
| 2,152,405 | Dreischerf | Mar. 28, 1939 |
| 2,564,957 | Cermak | Aug. 21, 1951 |